United States Patent Office 3,215,722
Patented Nov. 2, 1965

3,215,722
PROCESS FOR PREPARING P-CHLOROPHENYL BORATES
James E. Krueger, Midland, Mich., assignor to The Dow Chemical Company, Midland, Mich., a corporation of Delaware
No Drawing. Filed Dec. 27, 1960, Ser. No. 78,279
15 Claims. (Cl. 260—462)

This invention relates to a new process for preparing p-chlorophenols in a mixture of chlorinated phenols, wherein the p-chlorophenols are produced in substantially greater amounts than are the o-chlorophenols.

Specifically, the invention relates to a process for preparing p-chlorophenols having the formula:

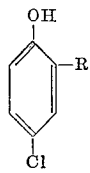

wherein R is either hydrogen or an inert substituent. Groups known to be inert in the reaction include halogen, phenyl, and alkyl, the term "halogen" representing fluorine, chlorine, bromine and iodine. Of the p-chlorophenols having an alkyl substituent in the ortho position, those having from 1 to 18 carbon atoms in the alkyl group are preferable, and those having from 1 to 4 carbon atoms are especially desirable.

It is known that chlorinated phenols can be prepared by the direct chlorination of phenols. However, the method of the present invention results in a higher ratio of para to ortho chlorination than in known chlorination processes.

For the practice of the present invention, one necessary starting material is a phenyl borate ester having no substituents in the position para to the oxygen bond and optionally containing in the ortho position to said oxygen bond, an inert substituent which may be, for instance, halogen, the phenyl radical, or an alkyl group.

In the method of the present invention, the phenyl borate ester described above is contacted with chlorine to prepare a p-chlorophenyl borate ester, the chlorination being carried out in a solvent medium and for a sufficient period of time to insure substantial conversion to the p-chlorophenyl borate ester. After the chlorination is completed the system may be flushed, if desired, with an inert gas such as nitrogen to remove HCl and any residual chlorine. Then an amount of water, at least equivalent to the borate esters present, is added to the reaction mixture to hydrolyze said esters to the corresponding phenols and a boric acid. The boric acid is optionally removed from the system, for example by filtration, and the desired p-chlorophenol separated from the hydrolysis mixture, preferably by distillation.

The term "phenyl borate ester" as used herein is meant to include the phenyl esters of the various boric acids, including orthoboric, metaboric, and the higher condensed boric acids.

The solvent used herein is preferably one chosen from benzene, chlorobenzene, dichlorobenzenes, and mixtures thereof, and chlorinated aliphatic hydrocarbon solvents, preferably containing from 2–4 chlorine atoms and not more than 3 carbon atoms, and is substantially inert under the reaction conditions employed herein.

The chlorination of the borate ester and the subsequent hydrolysis are carried out preferably at about room temperature, although temperatures varying therefrom may be utilized.

It is to be understood that the phenyl borate may be employed as such or may be prepared in situ from a phenol or substituted phenol and a boric acid.

The practice of the present invention is illustrated by the following examples.

Example I 142 grams (2 gram-moles) of chlorine were passed into a stirred solution of 175 grams (0.6 gram-mole) of triphenyl borate in 160 ml. of chloroform maintained at room temperature. Nitrogen was then passed through the reaction mixture for one hour. Then 21.3 grams of water were added and the mixture stirred for an additional hour. The precipitated boric acid was removed by filtration, after which the filtrate was washed with water. After distillation of the chloroform, the remaining product was distilled and collected as a single fraction boiling between 81° C. at 19 mm. and 142° C. at 8 mm. The distillate thus obtained weighed 210 grams (92.5 percent of theoretical for monochlorophenol). Infrared analysis proved the composition of this distillate to be 63 percent 4-chlorophenol, 22 percent 2-chlorophenol, 5 percent phenol, 4 percent 2,4-dichlorophenol, 4 percent 2,4,6-trichlorophenol and less than 1 percent 2,6-dichlorophenol.

Example II

The chlorination of phenyl metaborate, performed similarly to that of Example I, gave a product (87 percent of theoretical for monochlorophenol), which, by infrared analysis, was 77 percent 4-chlorophenol, 19 percent 2-chlorophenol, 4 percent 2,4-dichlorophenol, and less than 0.5 percent each of phenol, 2,6-dichlorophenol, and 2,4,6-trichlorophenol.

Example III

A solution of 33.2 grams of o-tolyl orthoborate in 200 ml. of methylene dichloride was cooled to 2° C. and stirred while 21.3 grams of chlorine were passed in over a period of 1.5 hours, the temperature remaining at 2–7° C. during the addition. The reaction mixture was allowed to warm to 18° C. and a 50-ml. aliquot was treated with 3.4 ml. of water and allowed to stand for one hour with frequent agitation. The precipitated boric acid was separated by filtration and the filtrate was dried over magnesium sulfate and the solvent removed at 10 mm. pressure. There were obtained 9.1 grams of cresols (98 percent of theoretical for monochlorocresol). Infrared analysis of the product showed its composition to be 85 percent 4-chloro-o-cresol, 8 percent 6-chloro-o-cresol, 4 percent o-cresol and 2 percent 4,6-dichloro-o-cresol.

In the process taught in U.S. Patent 2,659,759, the percent ratio of 4-chloro-o-cresol to 6-chloro-o-cresol was 1.6 to 1.

Results similar to those in the above examples are obtained when instead of o-tolyl borate there are used other o-alkylphenyl borates, such as for instance, o-ethyl-, o-propyl- or o-butylphenyl borate.

EXAMPLES IV–VII

In each of four experiments, a known quantity of phenyl orthoborate or substituted phenyl orthoborate was dissolved in an amount of solvent corresponding to 7–10 times the weight of borate, the solution treated with chlorine in amounts in excess of the stoichiometric requirement at from about 2° C. to about 25° C., for a sufficient length of time to effect maximum chlorination of the borate. The reaction mixture was then treated with nitrogen to remove HCl and unreacted chlorine, and sufficient water was added to hydrolyze the borate esters to the corresponding phenols, orthoboric acid precipitating as a co-product. The reaction mixture was then distilled and the distillate was collected and analyzed by infrared spectrometry. There are shown in Table I the type and amount of borate used, the particular solvent and amount, thereof employed, the weight of distillate obtained, the percent p-chlorophenol or substituted p-chlorophenol in the distillate and the percent ratio of the p-chlorophenol to the o-chlorophenol in the distillate.

said process being carried out in a solvent that is substantially inert in the process, said solvent being selected from the group consisting of benzene, chlorobenzene, dichlorobenzenes, and mixtures thereof, and chlorinated aliphatic hydrocarbon solvents, thus substantially chlorinating said ester in the para position.

*Table I*

| Example No. | Borate and Amount | Solvent and Amount | Weight Distillate, grams | p-chlorophenol in Distillate, Percent | Percent Ratio, p-chlorophenol/ o-chlorophenol |
| --- | --- | --- | --- | --- | --- |
| IV | Phenyl orthoborate, 0.5 gram-mole. | 1,450 ml. methylene dichloride. | 175 | 72 | 8.0 |
| V | Phenyl orthoborate, 0.17 gram-mole. | 484 ml. perchloroethylene. | 53.5 | 31 | 1.35 |
| VI | Phenyl orthoborate, 0.17 gram-mole. | 484 ml. benzene | 62 | 39 | 1.85 |
| VII | o-chlorophenyl orthoborate, 0.29 gram-mole. | 850 ml. methylene dichloride. | 112 | 25 | 10.7 |

EXAMPLE VIII 255 grams (1.5 gram-moles) of o-phenylphenol, 31 grams (0.5 gram-mole) of orthoboric acid and 800 ml. of toluene were mixed and refluxed for 11 hours at 114–115° C., the toluene-water azeotrope being removed continuously. A total of 20 ml. of water were removed, representing a 74.2 percent conversion of the phenol to 2-biphenylyl orthoborate. The reaction mixture was then distilled to remove the toluene and unreacted o-phenylphenol. The 2-biphenylyl orthoborate residue was taken up in 1120 ml. of methylene dichloride and treated with 88.7 grams (1.25 gram-moles) of chlorine at 23°–26° C. over a period of 3.75 hours. The reaction mixture was then stirred for several hours at 23°–26° C. and nitrogen passed into the system for 30 minutes.

To the reaction mixture, there were then added 57 ml. of water at 22–24° C., and this mixture was heated at 41°–42° C. for 1 hour. The precipitated boric acid was filtered from the mixture, the filtrate washed several times with 200-ml. portions of water to remove any residual acid and then distilled. The fraction boiling between 146°–177° C. at 10 mm. pressure and weighing 185.5 grams was found by infra-red analysis to be 49.3 percent 4-chloro-2-phenylphenol, 45.0 percent o-phenylphenol, 3.9 percent 2,4-dichloro-6-phenylphenol, and 1.9 percent 2-chloro-6-phenylphenol.

In addition to those borate esters disclosed as starting materials in the examples other borate esters may be employed as starting materials, such as, for example, o-bromophenyl orthoborate, o-fluorophenyl metaborate, o-ethylphenyl orthoborate, o-butylphenyl metaborate, o-n-hexylphenyl orthoborate, o-tert-octylphenyl orthoborate, o-nonylphenyl orthoborate, o-dodecylphenyl orthoborate, o-octadecylphenyl metaborate, and analogous p-chlorophenols may be derived therefrom.

The borates described above are conveniently prepared by reacting the appropriate phenol with a boric acid or boric oxide and removing the water produced, preferably by distillation.

I claim:

1. A process for preparing a p-chlorophenyl borate comprising reacting by contacting chlorine with a phenyl borate ester that is unsubstituted in the para position and contains no substituents that are reactive in the process;

2. A process as in claim 1 wherein the ester is phenyl borate.

3. A process as in claim 1 wherein the ester is o-chlorophenyl borate.

4. A process as in claim 1 wherein the ester is o-phenyl phenyl borate.

5. A process as in claim 1 wherein the ester is an o-alkylphenyl borate.

6. A process as in claim 1 wherein the borate ester is triphenyl orthoborate.

7. A process as in claim 1 wherein the borate ester is phenyl metaborate.

8. A process as in claim 1 wherein the solvent contains not more than 3 carbon atoms and from 2–4 chlorine atoms.

9. A process as in claim 1 wherein the solvent is benzene.

10. A process as in claim 1 wherein the solvent is chlorobenzene.

11. A process as in claim 1 wherein the solvent is a dichlorobenzene.

12. A process as in claim 8 wherein the solvent is chloroform.

13. A process as in claim 8 wherein the solvent is methylene dichloride.

14. A process as in claim 8 wherein the solvent is perchloroethylene.

15. A process as in claim 8 wherein the solvent is carbon tetrachloride.

References Cited by the Examiner
UNITED STATES PATENTS 2,985,688   5/61   Mersch et al. _____ 260—622

OTHER REFERENCES

Dains et al.: Trans. Kansas Acad. Science, 36:114–117 (1933). (4 pages.)

Steinberg et al.: Industrial and Eng. Chem., 49:174–181 (1957) (8 pages).

CHARLES B. PARKER, *Primary Examiner.*

HAROLD G. MOORE, LEON ZITVER, *Examiners.*